April 14, 1931.  A. H. WITT  1,800,581
FLUSH VALVE
Filed March 26, 1927
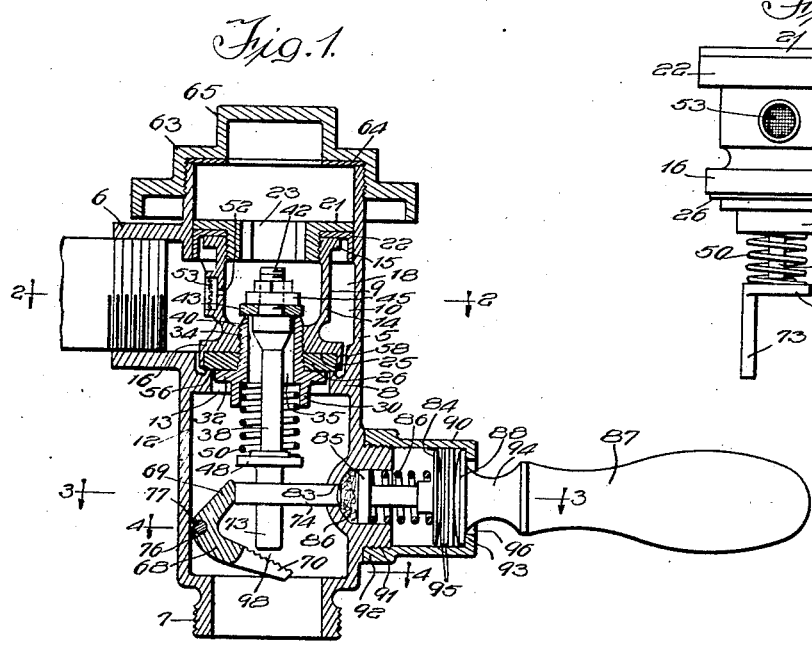
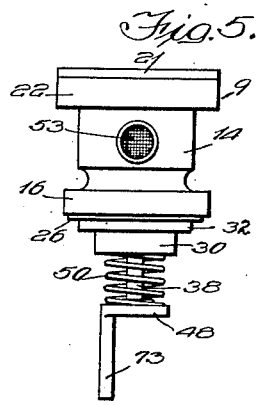
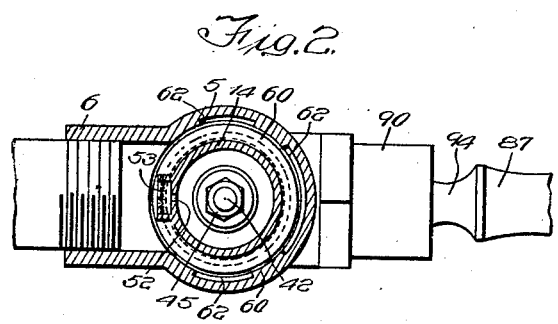
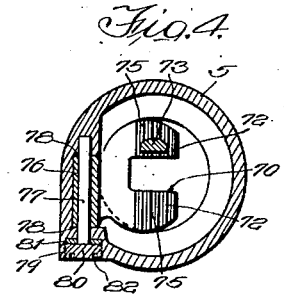
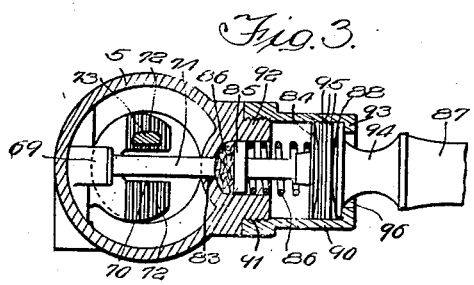
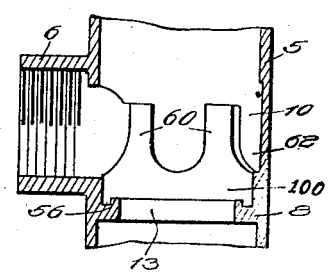
Witness:
William P. Kilroy
Inventor:
Agatho H. Witt
By Brown, Boettcher & Dienner
Attys Patented Apr. 14, 1931

1,800,581

UNITED STATES PATENT OFFICE

AGATHO H. WITT, OF CHICAGO, ILLINOIS, ASSIGNOR TO PEERLESS VALVE MANUFACTURING COMPANY, OF CHICAGO, ILLINOIS, A CORPORATION OF ILLINOIS

FLUSH VALVE

Application filed March 26, 1927. Serial No. 178,558.

This invention relates to flush valves and more particularly to flush valves such as are used with water closets and the like for producing a flush of water through the closet bowl.

While I shall describe the invention in connection with a particular valve of this sort, it is to be understood that the particular embodiment of the invention which I have shown is more in the way of illustration and that the invention may be employed or embodied wherever desired or suitable.

Valves of this sort are characterized by a lagging or slow closing action and it is desirable that this lag or the speed of closing or length of flush be adapted for regulation to meet the different conditions and different preferences in operation.

It is also desirable to secure a tight sealing or closing of the valve. In this connection it is desirable to minimize or eliminate the effect of wear and the lodgment of foreign particles between the valve and its seat upon proper and tight closing of the valve and a proper guiding of the valve to its seat is also advantageous.

The object of the present invention is the provision of a generally improved and simplified valve structure of this sort that may be economically and expeditiously produced and more specifically, the invention provides improved means for regulating the length of flush or period of closing of the valve, also, an improved valve and valve seat and improved means for guiding the valve properly to its seat under all conditions.

The regulating means is adapted for conveniently and expeditiously regulating the period of closing or length of flush without shutting off the water supply and without taking the entire valve apart or requiring access to the inside thereof.

The improved valve, valve seat and means for guiding the valve to its seat provide a tight closing valve in which leakage is reduced and they are economical in material as well as economical to manufacture, finish and assemble.

The invention is illustrated in the accompanying drawings, in which:

Figure 1 is a longitudinal section through an embodiment of the invention;

Fig. 2 is a transverse section taken on the line 2—2 of Fig. 1;

Fig. 3 is a transverse section taken on the line 3—3 of Fig. 1;

Fig. 4 is a transverse section taken on the line 4—4 of Fig. 1;

Fig. 5 is a side elevational view of the main valve member; and

Fig. 6 is a fragmentary section through the valve casing similar to Fig. 1 with the valve member removed to show the seat for the main valve member and the means for guiding the valve member to its seat.

Referring to the drawing the particular valve shown has a casing 5 provided with a lateral inlet pipe connection 6 and an axial outlet pipe connection 7. The particular relative disposition of these connections may, of course, be varied within the scope of the present invention. The inlet connection 6 is, for example, adapted for connection with the water supply pipe and the outlet connection with the pipe which leads into and flushes the closet bowl, where that is the use to which the valve is placed.

Internally and between the inlet connection 6 and outlet connection 7 the valve casing 5 has an annular flange 8 which with the valve 9, when closed, divides the interior of the casing 5 into an inlet chamber 10 and an outlet or discharge chamber 12. The flange 8 defines the port 13 which is controlled by the valve 9.

The valve 9 constitutes the main controlling valve member and it comprises the main barrel or body part 14 flanged at its upper end at 15 and at its lower end at 16. Between its flanged ends the part 14 is reduced to provide an annular chamber 18 between it and the interior of the casing 5 when the valve is in place therein. Threaded at 20 upon the upper end of the part 14 is an annular cap member 21 and clamped between the part 14 and the cap member 21 is a sealing element 22 of leather or other suitable material with its outer margin cupped downwardly and cooperable with the interior of the casing 5 to provide a tight joint between the upper end of the valve member and the interior of the casing. The cap 21 is open centrally at 23, placing the interior of the casing 5 above the valve member 9 in open communication with the interior of the barrel 14 of the valve member at all times.

The lower end of the body part 14 is recessed at 25 to receive an annular seating ring 26 which is preferably formed of a suitable yieldable seating material. The seating ring 26 is clamped in the recess 25 by a member 30 having a flange 32 which cooperates with the packing ring 26 and between which and the opposed surface of the member 14 the packing ring 26 is clamped. The member 30 has threaded engagement at 34 with the main body member 14 of the valve and this member 30 is hollow to form a relief port 35 adapted for placing the inlet chamber 10 in communication with the discharge chamber 12.

The relief valve operates in the port 35 and it comprises an axial generally cylindrical stem 38, headed at 40 and provided with an upwardly extending axial threaded stem 42. The bottom of the headed portion 40 may be tapered into the stem as shown to prevent interference with closing of the relief valve and a yielding seating ring 43 of suitable yieldable material is clamped upon the stem 42 and down upon the headed portion 40 by a suitable nut and collar 45 threaded upon the stem 42.

The seating ring 43 seats upon the upper end of the member 30 which is preferably tapered, as shown, to reduce the seating area and minimize or eliminate the effect of wear and the effect of the lodgment of foreign particles between the valve and its seat.

The stem 38 has a flange 48 and a coiled spring 50 interposed between this flange and the member 30 normally urges the relief valve to its seat.

The barrel or body 14 of the main valve has a lateral port 52 which is preferably restricted in size and which may be covered with a screen 53. The port 52 places the interior of the valve body 14 in communication with the inlet connection.

Surrounding the main valve port 13 on the upper surface of the flange 8 is an annular lip 56 which is preferably relatively narrow. This lip cooperates with the seating ring 26 and forms the main valve seat. Its relatively thin or narrow formation decreases the seating area so that the effect of wear is decreased and the possibility and effect of the lodgment of foreign particles between it and the seating ring 26 is also decreased, the diameter and width of the annular seat 56 being preferably such that it fits annularly between the periphery of the flange 32 and the depending annular flange 58 surrounding the recess 25.

The main valve 9 is guided to and from its seat by raised guides or high spots 60 formed on the interior of the casing 5 above the flange or partition 8. These guides or high spots 60 may be finished and they eliminate the necessity of finishing the entire interior of the casing and provide clearance spaces 62 (Fig. 2) between the main valve body and the interior of the valve casing. These raised high spots or guide surfaces 60 preferably extend down to the flange 8 and the guide surface may be continuous circumferentially about the interior of the casing at the lower ends of these longitudinal guides. This continuity at the lower ends of the guides 60 forms, in effect, a counterbore portion 100 into which the lower end 16 (Figure 5) of the valve is telescopically guided to its seat by the guides 60 with a sliding fit between the valve end 16 and the counterbore portion. As apparent from Figure 6 the top of the counterbore portion 100 terminates at about the bottom of the interior of the inlet 6 so that as the lower end 16 of the valve enters this counterbore portion 100 it closes off entry of foreign material in suspension in the latter to prevent same from accumulating beneath the valve. This prevents accumulations of matter of this sort between the valve and the valve seat at the closure and at the same time the sliding fit of the valve end 16 in the counterbore portion 100 may pass sufficient water to flush the space between the seat and the bottom of the valve as the valve moves to its seat 56 after entering the counterbore portion 100. At the same time this construction may provide after fill of the closet bowl as it cuts off full flow of water, allowing partial flow just preceding full closure of the valve. The upper ends of the guides 60 preferably extend up sufficiently to receive and cooperate with the lower flanged end 16 of the valve body throughout its range of movement. With such an extension of these guides the valve is guided toward its seat before the flange 32 reaches the port 13 and before the seating ring 26 comes into cooperation with the main valve seat.

The raised guides 60 are preferably integral, as shown but it is, of course, to be understood that they may be made up separately from the casing and suitably fastened therein.

The upper open end of the casing 5 may be closed by a closure or cap nut 63. The joint between the member 63 and the upper end of the casing 5 may be gasketed at 64 and the member 63 may have a hexagonal or other suitably finished head 65 for engagement by a wrench or other suitable tool.

Pivoted in the outlet chamber 12 of the casing 5 is a bell crank lever 68 having an upwardly extending generally centrally disposed arm 69 with its other arm bifurcated at 70 to provide two sides 72. The integral depending stem 73 at the lower end of the stem 38 is offset laterally to one side of the flange 48 so that it will extend down for cooperation at its lower end with either of the sides 72 without interfering with the generally centrally disposed operating plunger stem 74. The upper surfaces of the sides of the arm 72, 72 which cooperate with the lower end of the stem 73 are preferably corrugated or roughened as shown at 75 to prevent relative slippage between them and the stem 73. The two arms 72 of the bell crank lever provide a balanced lever and disposes one arm on each side of the stem 74 so that only one stem 73 is required and this stem will engage one of the arm sides 72 regardless of which side the stem 73 passes the stem 74. The valve may, therefore, be assembled with the stem 73 on either side of the stem 74 and so long as it passes the stem 74 it will engage one or the other of the arms 72.

The bell crank lever 68 has a hub portion 76 and a pin 77 journaled at its ends in the casing 5 extends through this hub portion 76 and pivotally mounts the lever 68 within the casing. The hub 76 preferably fits between integral shoulders 78 within the casing and one end of the opening for the pin 76 opens externally and is countersunk at 79. This opening permits convenient insertion and removal of the pin 77 and a plug member threaded in the countersunk outer end closes the same. A washer 81 may be provided upon the pin 77 between the casing 5 and the plug 80 and the plug may have diametrically opposite recesses 82 for engagement by a tool for removing and replacing the plug.

The stem 74 extends out laterally through an opening 83 and terminates at its outer end in a head 84. Slidable upon the stem 74 between its ends is a collar 85 and a spring 86 interposed between this collar and the head 84 seats and compresses the packing 86 which is placed about the stem 74 between the collar 85 and the adjacent wall of the casing 5.

The manipulative means for operating the valve is shown as comprising a handle 87 having a head 88 at its inner end. The opposed faces of the heads 84 and 88 are preferably rounded or convex slightly as shown.

The head 88 is swiveled in a socket sleeve 90 threaded at 91 upon the tubular casing extension 92. The outer end of the sleeve 90 is flanged at 93 and the connecting neck 94 between the head 88 and handle 87 passes freely through the opening 96 so that the handle 87 is free to be swung out of alignment with the stem 74 in any direction.

Interposed between the heads 84 and 88 and housed within the sleeve 90 are one or preferably a plurality of separate spacers 95 through which the thrust of the head 88 in swinging the handle 87 out of alignment with the stem 74, is transmitted to the stem 74. These spacers 95 are preferably in the form of circular discs although this may, of course, be varied and these spacers are preferably of different thicknesses.

In operation the thrust of the stem 74 swings the bell crank lever 68 in a counterclockwise direction, one side of the bifurcated arm 72 engaging the stem 73 and lifting the relief valve, whereupon the water from the connection 6 enters the outlet chamber 12 and equalizes the pressure upon opposite sides of the main valve so that as the stem 38 continues to be lifted by bell crank 68 it operates through spring 50 to lift the main valve 9 with the assistance of incoming water or fluid, and produces a flush of water through the outlet 7. Upon releasing the handle 87 it is returned by the spring 86 into position in alignment with the stem 74 as shown, the relief valve is closed and the main valve is seated.

The open period of the main valve and thereby the duration of the flush through the outlet 7 is dependent upon the lift of the main valve and by removing any one or combination of the spacers 95 or adding one or any combination of such spacers, this lift, and thereby the duration of the flush, may be adjusted or regulated to meet any conditions or preferences. By making the spacers of different thicknesses the separate removal of different spacers will produce different amounts of regulation and it is to be understood that any number or combination of spacers of this sort may be employed. Three spacers of different thicknesses are shown but this may vary and the spacers may, if desired, be of the same thickness. They adjust the normal position of the inner end of the stem 74 and thereby the clearance indicated at 98 in Fig. 1 between the bell crank arm 72 and the lower end of the stem 73. This adjusts or regulates the amount of lift of the main valve for a given thrust of the stem 74.

To remove from or add to the spacers all that is necessary is to remove the socket sleeve 90 and the period of flush may thereby be regulated as small or large amount as desired and to more than two different periods, all simply and conveniently and without shutting off the water supply to the valve as well as without taking the entire valve apart or requiring access to the inside thereof.

The false bottom or lower end of the cap 63 gives the valve a relatively large appearance and at the same time provides for threaded engagement with the upper end of the casing 5.

I claim:—

1. In combination, a valve, manipulative means therefor, means for transmitting the manipulation to the valve and means interposed between the manipulative means and said last means for adjusting the action of the valve, said adjusting means comprising a plurality of discs free of said manipulative and said transmitting means and said manipulative means having wiping contact with and movement across the surface of said adjusting means.

2. In combination, a valve, manipulative means therefor, means for transmitting the manipulation to the valve and means comprising a plurality of separate spacer members adapted to be introduced and removed from between the manipulative means and said last means for adjusting the action of the valve, said adjusting means being free of both said manipulative and said transmitting means and said manipulative means having wiping contact with and movement across the surface of said adjusting means.

3. In combination, a valve, manipulative means therefor, means for transmitting the manipulation to the valve, and means interposed between the manipulative means and said last means for adjusting the action of the valve, said last means comprising a plurality of disc-like members of different thicknesses and adapted for separate introductions and removal, said adjusting disc-like members being free of both said manipulative and said transmitting means and said manipulative means having a rounded head having wiping contact with and movement across the surface of the adjacent adjusting disc-like members.

4. In combination, a valve casing, a valve therein, a push stem entering the casing and adapted for opening said valve, said push stem having an extending portion, a socket sleeve fitting over the extending portion of said stem and attached to said casing, the outer end of the extending portion of said stem having a rounded head, manipulative means swiveled in said sleeve and having a rounded head at its inner end, and a plurality of separate spacers interposed between the rounded head on said manipulative means and the rounded head on said extending stem portion and housed within the socket sleeve for imparting the manipulation to the stem and adjusting the action of the valve, said adjusting spacers being free of both the said manipulative and said transmitting means and the rounded head of said manipulative means having wiping contact with and movement across the surface of the adjacent adjusting spacer.

5. In combination, a valve casing, a valve therein, a push stem entering the casing latterly, and adapted for actuating said valve, said push stem having an extending portion, a socket sleeve fitting over the extending portion of said stem and attached to said casing, manipulative means swiveled in said sleeve, a first head at the outer end of the extending stem portion, means packing the entry of said stem into the casing, a coiled spring interposed between said head and said packing means, a second head at the inner end of the manipulative means and a plurality of separate spacers interposed between said first and second heads and housed within the socket sleeve for imparting the manipulation to the stem and adjusting the action of the valve, said spacers being free of both said manipulative means and said push stem and the head at the inner end of the manipulative means having wiping contact with and movement across the surface of the adjacent spacer.

6. In combination, a valve casing, a valve therein, a push stem entering the casing and adapted for actuating said valve, said push stem having an extending portion, a socket sleeve fitting over the extending portion of said stem and attached to said casing, manipulative means swiveled in said sleeve, a head on the outer end of the push stem, a head on the inner end of the manipulative means, said heads having convex opposed surfaces, and a plurality of spacers interposed between said surfaces for imparting the manipulation to the stem and adjusting the action of the valve, said adjusting spacers being free of both the manipulative means and said push stem and the convex surface of the head on the manipulative means having wiping contact with and movement across the surface of the adjacent adjusting spacer.

7. In a valve of the class described, the combination of a valve casing, said casing having an inlet, a seat within said casing, a valve member movable into and out of engagement with said seat, a counterbore extending between the inlet and the valve seat, said valve member having sliding fit with said counterbore and said counterbore guiding said valve to its seat and spaced guides ahead of said counterbore for guiding the valve to said counterbore and permitting full flow of water, the sliding fit of said valve member with said counterbore reducing the water flow upon entry of the valve into the counterbore.

In witness whereof, I hereunto set my hand this 22 day of March, 1927.

AGATHO H. WITT.